United States Patent
Breen et al.

(10) Patent No.: US 7,582,320 B2
(45) Date of Patent: Sep. 1, 2009

(54) ACID ACTIVATED MONTMORILLONITE BASED FILTRATION AID

(75) Inventors: Michael J. Breen, Erie, PA (US); Marc Siegel, Hanover (DE)

(73) Assignee: BASF Catalysts LLC, Florham Park, NJ (US)

( * ) Notice: Subject to any disclaimer, the term of this patent is extended or adjusted under 35 U.S.C. 154(b) by 1358 days.

(21) Appl. No.: 10/316,737

(22) Filed: Dec. 11, 2002

(65) Prior Publication Data

US 2004/0115330 A1 Jun. 17, 2004

(51) Int. Cl.
*A23L 1/22* (2006.01)
*A23L 1/227* (2006.01)

(52) U.S. Cl. .......................... 426/253; 554/191; 502/81

(58) Field of Classification Search .................. 426/253; 554/191; 502/81
See application file for complete search history.

(56) References Cited

U.S. PATENT DOCUMENTS

| | | | |
|---|---|---|---|
| 2,903,434 A * | 9/1959 | Gloss et al. | 502/82 |
| 3,787,330 A | 1/1974 | Sugahara et al. | |
| 5,008,226 A | 4/1991 | Taylor et al. | 502/81 |
| 5,008,227 A | 4/1991 | Taylor et al. | 502/83 |
| 5,486,499 A | 1/1996 | Davies et al. | |
| 5,628,916 A | 5/1997 | Stevens et al. | 210/798 |
| 5,783,511 A * | 7/1998 | Banin et al. | 501/146 |
| 6,027,755 A * | 2/2000 | Henderson et al. | 426/253 |
| 6,172,248 B1 | 1/2001 | Copeland et al. | 554/190 |
| 6,288,003 B1 * | 9/2001 | Fabry et al. | 502/81 |
| 6,346,286 B1 | 2/2002 | Council et al. | 426/330.6 |
| 2002/0072469 A1 | 6/2002 | Hill et al. | |

FOREIGN PATENT DOCUMENTS

DE 229424 11/1985

OTHER PUBLICATIONS

International Search Report for PCT/US03/39006 dated Jan. 31, 2005.

* cited by examiner

*Primary Examiner*—Deborah D Carr
(74) *Attorney, Agent, or Firm*—Bernard Lau

(57) ABSTRACT

Disclosed are bleaching materials for processing oils, particularly edible oils, containing an acid activated clay having a specifically defined particle size distribution. Also disclosed are methods of making the bleaching materials, and systems and methods for purifying oils using the acid activated clay having the specifically defined particle size distribution.

22 Claims, 5 Drawing Sheets

Packed Bed Bleaching Example**

Packed Bed Bleaching Example

Press Effect Bleaching Example

Filter Rate Comparison

ACID ACTIVATED MONTMORILLONITE BASED FILTRATION AID

FIELD OF THE INVENTION

The present invention generally relates to an acid activated clay that functions as both a filtration aid and bleaching agent, and to systems and methods of processing oils using the acid activated clay filtration aid/bleaching agent.

BACKGROUND OF THE INVENTION

Vegetable oils are typically obtained by pressing or extracting the oil seeds of plants. Properly processed vegetable oils are suitable for use in many edible oil and fat compositions destined for human consumption. Such edible oils and fats include salad oils, cooking oils, frying fats, baking shortenings, and margarines.

Vegetable oils primarily consist of triglycerides, but several other compounds are also present. Some of these additional compounds, such as diglycerides, tocopherols, sterols, and sterol esters, need not necessarily be removed during processing. Other compounds and impurities such as phosphatides, free fatty acids, color pigments, soaps, gums, albuminous matter, odoriferous volatiles, colorants, waxes, and metal compounds negatively affect taste, smell, appearance and storage stability of the refined oil, and hence must be removed.

Phospholipids, which occur in most natural fats and oils, can cause objectionable colors, odors and flavors in a finished oil product. Phosphorus and metal ions such as calcium, magnesium, iron, and copper are believed to be chemically associated with phospholipids, including phosphatides, and have deleterious effects on refined oil products. Moreover, calcium and copper can form precipitates, while iron and copper promote oxidative instability. Free fatty acids result from hydrolysis of the triglycerides of the edible oils. Color impurities typically present in oils include, for example, carotenoids, xanthophylls, xanthophyll esters, chlorophyll, tocopherols, as well as oxidized fatty acids and fatty acid polymers. Peroxides (reported as peroxide value, PV) are products of oxidation of the oil.

Oil impurities are typically removed in four distinct steps of degumming, refining, bleaching, and deodorizing. Of these four steps, degumming removes the largest amount of impurities, the bulk of which are hydratable phosphatides. Refining primarily removes non-hydratable phosphatides, soaps created from the neutralization of free fatty acids, and other impurities such as metals. Bleaching then improves the color and flavor of refined oil by decomposing peroxides and removing oxidation products, trace phosphatides, and trace soaps. Deodorizing is the final processing step and prepares the oil for use as an ingredient in many edible products. The deodorizing process generally comprises passing steam through refined oil at high temperature and under near vacuum conditions to vaporize and carry away objectionable volatile components.

Acid-activated clays of high activity are used to adsorb colored pigments (carotenoids, chlorophyll) and colorless pigments (phospholipids) from edible and inedible oils. This process is called "bleaching" and serves both cosmetic and chemical purposes. Thus, bleaching reduces color, whereby very clear, almost water white oils are produced that meet with consumer expectations. Bleaching also stabilizes the oil by removing colored and colorless pigments which tend to "destabilize" the oil (facilitate oxidation), resulting in oils that rancidify more easily if they are not removed.

The filtering of edible oils which are bleached is accomplished by filter assemblies having a diatomaceous earth precoat. The precoat is an inert material and does not contribute to bleaching performance. Before the edible oil is introduced into the tank of the filter assembly, a slurry of a precoat material, such as diatomaceous earth, in a liquid is directed into the tank. As the liquid passes through the porous media (filter screen), the precoat material is deposited on the porous media, forming a layer of precoat material on the face of the filter.

Once a sufficient layer of precoat material is deposited on the filter, the flow of slurry into the tank may be terminated and the edible oil containing the particles of bleaching clay is introduced into the tank. As the edible oil flows through the precoat layers of the filter, the particles of bleaching clay are trapped in the precoat layer. The filtered edible oil then flows through the porous media of the filter and exits the filter assembly.

The precoat layer eventually becomes fouled with the particles of bleaching clay which are filtered from the oil stream. Essentially, the build-up of particulate solids in and on the precoat increases the pressure drop across the filter, thereby degrading the performance of the filter. Consequently, the flow of edible oil into the tank of the filter assembly is periodically terminated and the filter assembly is backwashed to remove the precoat layer and the build-up of particulate solids trapped in the precoat layer. Typically, a cleaning liquid, referred to as a backwash liquid, is forced at a high flow rate, pressure, and/or volume in a reverse direction through the filter and through the porous. The backwash liquid flowing in the reverse direction to the porous medium forces the precoat layer and the particles of bleaching clay off of the porous medium so the backwash liquid and the solids material are removed. Once the filter assembly is backwashed, another cycle of introducing the precoat slurry into the tank to form the precoat layer, introducing the contaminated edible oil into the tank to remove the particles of bleaching clay, and backwashing the fouled precoat layer is begun.

While this process of filtering edible oils through a leaf filter assembly is very effective for removing particles of bleaching clay, it nonetheless has several problems. For example, this process generates a huge amount of contaminated waste. Though the quantity of precoat material is small compared to the quantity of bleaching clay (about 5 to 40 parts clay per part precoat), all of the solids and contained oil must be properly disposed of once it is flushed from the filter assembly. Further, once the spent precoat layer is backwashed from the filters, a new precoat layer must again be deposited on each face of the filter. This is a time consuming portion of the cycle which detracts from the overall efficiency of the process since none of the edible oil is being filtered while the precoat layer is being re-deposited. In addition, in many instances, it is difficult to remove all of the precoat from the filter.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention provides high bleaching efficiency clays that also act as filtration aids. The high bleaching efficiency clays have a number of advantages. One advantage is that smaller amounts of the high activity bleaching clays are required to produce refined oil with desired properties compared to the amount of conventional bleaching earth, which means that lower inventories of bleaching clay can be maintained by the oil refiner. Another advantage is that the necessity of a precoat layer for filtering oils is eliminated, lowering the waste and improving the efficiency of the bleaching process. Since refined oil losses depend somewhat on the amount of clay used, use of lesser amounts of high activity clay means that oil losses are lower. The use of lesser amounts of high activity clay means that less spent clay is produced, and hence land-fill disposal costs are lower.

One aspect of the invention relates to bleaching materials for processing oils containing an acid activated clay having a specifically defined particle size distribution where more than 50% by volume of the acid activated clays have a particle size of about 50 or more and about 150 μm or less. Another aspect of the invention relates to systems and methods for purifying oils using the acid activated clay having the specifically defined particle size distribution.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
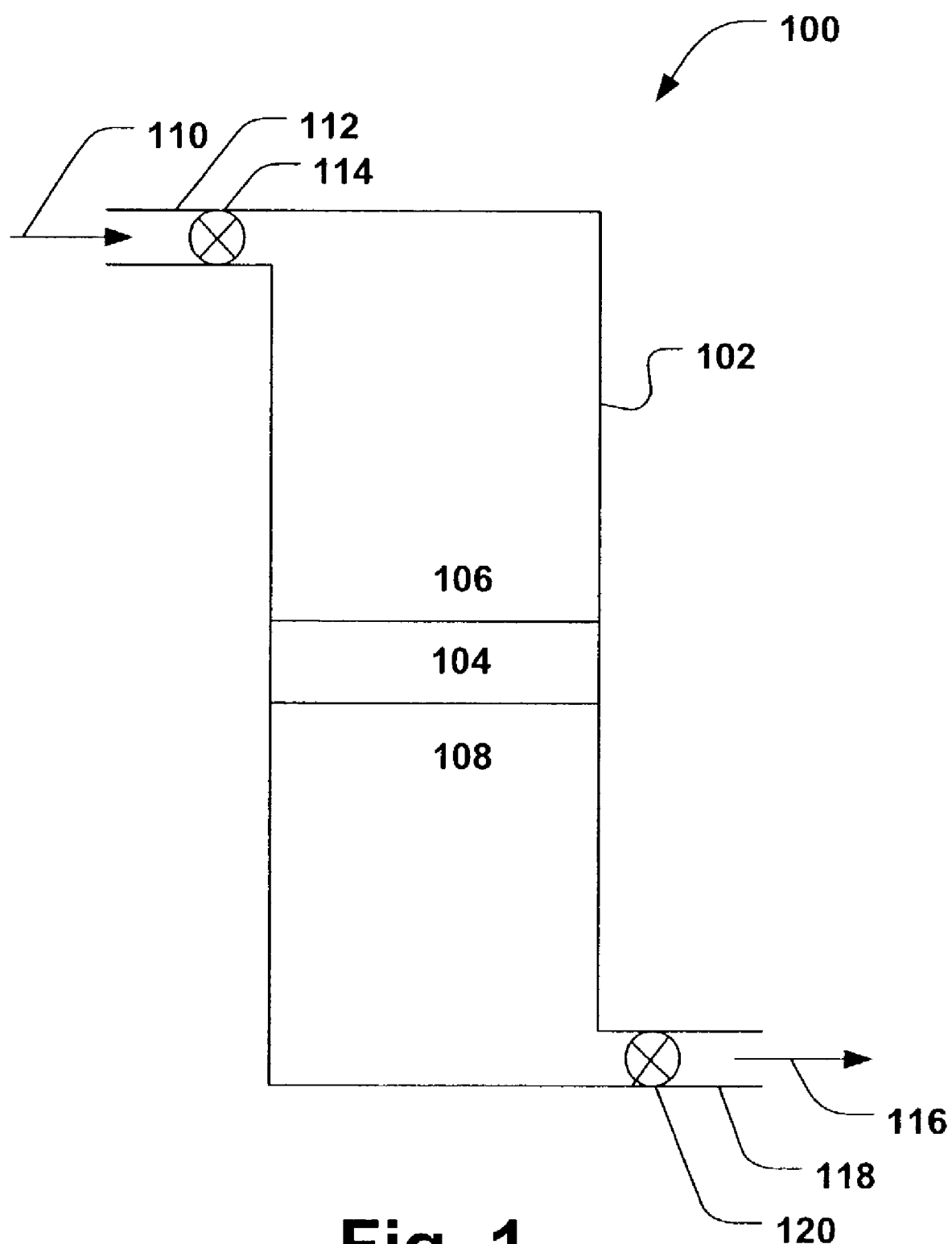
FIG. 1 is a schematic illustration of an exemplary filter system in accordance with one aspect of the present invention.

Most crude vegetable, animal and marine oils contain impurities which must be removed before they are suitable for human consumption. One purpose of oil refining and bleaching is to remove impurities which promote oil instability and to improve the appearance and taste of the oil. The acid activated clays having a certain size distribution are used to remove impurities such as pigments including chlorophyll and carotene and their derivatives, with or without the use of a filteraid precoat layer. The acid activated clays having a certain size distribution also adsorb other components such as soaps and phosphatides.

The acid activated clays having a certain size distribution so that the conventional requirement of using a filteraid with a bleaching clay is eliminated. Thus, when acid activated clays of the present invention are employed in bleaching oils, the use of a filteraid is unnecessary and thus optional when filtering the bleached oil. Alternatively, if a filteraid is employed when filtering a bleached oil to remove the bleaching clay therefrom, and the acid activated clays of the present invention are employed as a bleaching clay, markedly more oil can be bleached compared to the bleaching capacity of conventional bleaching earths and/or markedly more conventional bleaching earth is required to bleach the same amount of oil. Further, the acid activated clays of the present invention can be employed with conventional bleaching earth to increase the amount of oil bleached or decrease the overall amount of bleaching material employed, had only the conventional bleaching earth be used, as well as act as a filteraid. When the acid activated clays of the present invention can be employed with conventional bleaching earth, they act as an active filteraid in that they contribute bleaching activity rather than as an inert filteraid which is conventionally used.

The acid activated clays that may be employed to form the filtration aid/bleaching agent are bentonite clays and other montmorillonite-containing clays. Bentonite clays include smectite, hectorite, and montmorillonite. Montmorillonite typically forms microscopic or at least very small platy micaceous crystals. Montmorillonite is the main constituent in bentonite.

Acid activated clays are formed by putting a bentonite clay through a chemical treatment such as contact with a mineral acid and/or an organic acid. Examples of acids include nitric acid, halogen acids such as hydrofluoric acid, hydrochloric acid, hydrobromic acid and hydroiodic acid, sulfuric acid, sulfurous acid, perchloric acid, boric acid and phosphorous acids such as phosphorous acid and phosphoric acid, alkanoic acids, including formic acid, acetic acid, propionic acid, butyric acid and so on (generally containing 1 to about 10 carbon atoms), dicarboxylic acids, such as oxalic acid, malonic acid, succinic acid and so on (generally containing 1 to about 12 carbon atoms), hydroxyalkanoic acids, such as citric acid (generally containing 1 to about 10 carbon atoms), organic phosphorous acids such as dimethylphosphoric acid and dimethylphosphinic acid, sulfonic acids such as hydrocarbylsulfonic acids (containing 1 to about 20 carbon atoms) including methanesulfonic acid, ethanesulfonic acid, 1-pentanesulfonic acid, 1-hexanesulfonic acid, 1-heptanesulfonic acid, aromatic sulfonic acids such as benzenesulfonic acid, tolulenesulfonic acid, and the like.

Contacting the clay with acid can include soaking and then washing out the acid and leachable salts, spraying the clay with acid, forming an acid-clay slurry and spray drying, and/or impregnating the clay with the acid, without washing. The clay may be mixed, pulverized, and subjected to other process steps.

Various acid activated clays are described in A. D. Rich, "Bleaching Clay", Industrial Rocks and Minerals, 3rd Ed., AIME, N.Y. pp 92-101 (1960); R. L. Grim, "Applied Clay Mineralogy", pp 320-326, (1962); R. Fahn, "Bleaching Earths—Preparation, Properties, Practical Applications", Chapter 1, International Symposium, Brussels, April 28-29 (1976); L. L. Richardson, "Use of Bleaching Clays in Processing Edible Oils", JAOCS, 55, 777 (1978); D. R. Erickson, et. al., editors, "Handbook of Soy Oil Processing and Utilization", John Wiley & Sons, Inc., N.Y., pp 110-116 (1980); G. M. Clarke, "Special Clays", Ind. Minerals, September 25 (1985); A. C. D. Newman, "Chemistry of Clays and Clay Minerals", pp 107-114 (1987); D. R. Taylor & D. B. Jenkins, "Acid Activated Clays", Soc. Mining Eng. of AIME Transactions, 282, 1901 (1988); H. B. W. Patterson, "Bleaching and Purifying Fats and Oils—Theory and Practice", pp 77-81 (1992); U.S. Pat. No. 1,397,113 (Prutzman); U.S. Pat. No. 1,579,326 (Kauffman); U.S. Pat. No. 1,642,871 (Chappell, et. al); U.S. Pat. No. 2,470,872 (Secor); U.S. Pat. No. 2,472,489 (Pierce); U.S. Pat. No. 2,484,828 (Hickey); U.S. Pat. No. 2,553,239 (Christianson); U.S. Pat. No. 2,563,977 (Van Horn); U.S. Pat. No. 2,574,895 (Stacker); U.S. Pat. No. 2,671,058 (Mickelson); U.S. Pat. No. 2,872,419 (Farnand); U.S. Pat. No. 2,892,800 (Taipale); U.S. Pat. No. 2,981,697 (Mickelson, et. al); U.S. Pat. No. 3,617,215 (Massaire, et. al); U.S. Pat. No. 5,008,226 (Taylor, et. al); U.S. Pat. No. 5,008,227 (Taylor, et. al); and U.S. Pat. No. 6,027,755 (Henderson, et. al). The foregoing articles and patents are hereby incorporated by reference for their teachings of bleaching clays and processes for their preparation.

The acid activated clays have a particular particle size distribution that contributes to its ability to function as both a filtration aid and a bleaching agent. In one embodiment, at least 90% by volume of the acid activated clays have a particle range size of about 10 or more and about 325 µm or less and more than 50% by volume of the acid activated clays have a particle size range of about 50 or more and about 150 µm or less. In another embodiment, at least 90% by volume of the acid activated clays have a particle size range of about 15 or more and about 305 µm or less and more than 50% by volume of the acid activated clays have a particle size range of about 55 or more and about 145 µm or less. In yet another embodiment, at least 90% by volume of the acid activated clays have a particle size range of about 20 or more and about 300 µm or less and more than 50% by volume of the acid activated clays have a particle size range of about 60 or more and about 140 µm or less. In still yet another embodiment, at least 30% by volume of the acid activated clays have a particle size range of about 75 or more and about 120 µm or less.

There are a substantial number of acid activated clay particle having a relatively large size. For example, in one embodiment, at least 30% by volume of the acid activated clays have a particle size range of about 100 µm or more. In another embodiment, at least 40% by volume of the acid activated clays have a particle size range of about 100 µm or more. In another embodiment, at least 45% by volume of the acid activated clays have a particle size range of about 100 µm or more.

Particle size range and particle size distribution as used herein are measured with a Malvern Mastersizer S Particle Size Analyzer. Measurements are recorded in deionized water. Dispersions are prepared by addition of dry sample to water in a stirred tank. The slurries are then subjected to ultrasonic treatment for 60 seconds prior to analysis. Particle size and distribution are calculated from laser light scattering data collection using conventional Fourier optics and reverse Fourier optics. The median particle size, by definition, is the particle size at the 50 volume % level. For example, the median particle size is from about 65 µm to about 90 µm.

Particle size techniques are employed to provide the acid activated clays having the particular size distribution. Particle size techniques involve removing small and large particles to provide the ranges described above. For example, one or more of crushing techniques, pulverization techniques, air classification techniques, screening techniques, may be employed to provide the particular size distribution (before or after contact with acid). Generally speaking, fine particles are removed while coarser particles are retained when processing from raw acid activated clay sources. The particle size distribution of the present invention decreases instances where the filter element is fouled or clogged, since a filtercake of coarse particles permits oil to flow therethrough.

The acid activated clays have a particular surface area that contributes to its ability to function as both a filtration aid and a bleaching agent. In one embodiment, the acid activated clays have a surface area from about 300 m$^2$/g to about 400 m$^2$/g. In another embodiment, the acid activated clays have a surface area from about 310 m$^2$/g to about 375 m$^2$/g. In yet another embodiment, the acid activated clays have a surface area from about 330 m$^2$/g to about 355 m$^2$/g.

Optionally, a minor amount of a dispersing agent or a flocculating agent may also be incorporated into the filtration aid/bleaching agent to facilitate dispersion/suspension of the particles in the oil. In addition, materials other than bleaching clay may be incorporated into the filtration aid/bleaching agent in order to provide additional properties. For example, a minor amount of special water-soluble or water-dispersible sorbents (for example, silicas, aluminas, and other clays) to selectively adsorb sulfur, soaps, phosphorous or other deleterious compounds may be incorporated into the filtration aid/bleaching agent. Another optional additive may be activated carbon, which can have a beneficial effect on the finished bleached oil, removing non-polar impurities which are not effectively removed with bleaching clay alone.

The oils that can be processed in accordance with the present invention include edible and nonedible oils. Both edible and nonedible oils include vegetable oils, animal oils (including fish oils), microbial oils, fungal oils, oils from genetically modified sources, and synthetic oils. Examples of edible vegetable oils include canola, coconut, corn germ, cottonseed, olive, palm, peanut, rapeseed, safflower, sesame seed, soybean, sunflower oils, and many others. Edible animal-derived oil include animal organ oils, fish oils, lard and tallow.

Generally, bleaching an oil involves combining the oil with the acid activated clay to form an oil mixture, then removing the acid activated clay to provide a purified oil. The oil mixture is at least one of heated and agitated for suitable period of time to facilitate bleaching.

In one embodiment, the oil mixture is heated to a temperature from about 40° C. to about 200° C. for a time from about 1 second to about 3 hours, with or without agitation. In another embodiment, the oil mixture is heated to a temperature from about 50° C. to about 150° C. for a time from about 10 seconds to about 60 minutes. In yet another embodiment, the oil mixture is heated to a temperature from about 60° C. to about 110° C. for a time from about 1 minute to about 30 minutes.

In one embodiment, the oil mixture is agitated for a time from about 1 second to about 3 hours, with or without heat. Agitating involves mixing, blending, stirring, using ultrasonic techniques, shaking, vibrating, and the like. In another embodiment, the oil mixture is agitated for a time from about 10 seconds to about 60 minutes. In yet another embodiment, the oil mixture is agitated for a time from about 1 minute to about 30 minutes.

Generally, filtering oils involves passing the oil mixture containing the acid activated clay into a filter system, removing the solid particulate matter from the oil by directing the oil through a filter element, and accumulating the solid particulate matter directly on the filter element, thereby forming a filter cake. Using a precoat material to coat the filter element is not necessary and thus not performed, as the acid activated clay acts as a filter aid and forms a filter cake. In some instances, formation of the filter cake is facilitated by passing the oil mixture through the filter element under pressure, such as continuously increasing or incrementally increasing pressure.

Alternatively and/or additionally, once the acid activated clay forms a cake on the filter element, it is not necessary to add an oil mixture to filter system. In this connection, oil can be charged directly to the filter system, and bleaching/purification occurs as the oil passes through the filter cake and filter element. As a result, less bleaching material may be used, compared to conventional techniques that pre-mix a bleaching material with oil before filtering the bleaching material. This is termed packed bed bleaching.

In embodiments where the acid activated clay forms a cake on the filter element, an oil mixture containing oil and optionally a bleaching material not in accordance with the invention may be charged to the filter system. Such a bleaching material, not in accordance with the invention, is one by designation F-115FF available from Engelhard Corporation. In embodiments where a bleaching material not in accordance with the invention is mixed with the oil, notably less bleaching material is required to achieve the same or better level of impurity removal, since the cake, formed using the acid activated clay of the present invention, contributes to the bleaching ability of the system. Consequently, there is less waste generated by such oil processing methods/systems. In embodiments where no bleaching material is mixed with the oil, bleaching is carried out by the filter cake (made of the acid activated clay of the present invention).

Excellent pressure drop characteristics may be achieved when employing the acid activated clay of the present invention. A markedly higher volume of raw oil can be bleached and filtered using the acid activated clay of the present invention, without backwashing or changing the filter media. That is, the flowrate of raw oil through the filter element coated with the acid activated clay of the present invention is fairly constant over the course of filtering a high volume of raw oil.

Optionally, the filter system may be backwashable. In this connection, the method of filtering oils optionally comprises backwashing the filter element after the cake of solid particulate matter accumulates on the filter element by directing a backwash fluid through the filter medium, to clean the filter element having the solid particulate matter removed from the oil accumulated thereon.

Referring to FIG. 1, an exemplary filter system 100 is shown. The filter system 100 includes a housing 102, which is divided by a filter element 104, into first and second chambers 106 and 108. The filter element 104 is any suitable filtering apparatus that can separate the acid activated clay of the invention from the oil. For example, the filter element 104 may include one or more cylindrical filter elements, one or more conical filter elements, one or more cubical filter elements, and the like, although the shape of the filter element is not critical to the invention.

The filter element can be made of any suitable material such as plastics, such as polyaramids, polyolefines, polycarbonates, polyimides, polyesters and the like, and metal such as aluminum, copper, stainless steel, and the like or any other suitable material resistant to corrosion from the materials of the filtering process.

The filter element may have a uniform or a graded pore structure. In a graded pore structure, typically the upstream region has larger pores than the downstream region. Generally speaking, the average pore size of the filter element is or varies from about 25 μm to about 400 μm. In another embodiment, the average pore size of the filter element is or varies from about 50 μm to about 300 μm.

The arrangement illustrated in the figure may be used for filtering oil through the filter element 104. During the filtering operation, the oil mixture containing oil and acid activated clay flows from the first chamber 106 into the second chamber 108 through the filter element 104.

The housing 102 may have any suitable shape or size. Generally, the shape of the housing 102 and the material(s) utilized for construction thereof are selected on strength considerations so that the housing 102 has sufficient strength to withstand the pressures exerted on it during filtration or optional backwashing. Typically, the housing 102 is constructed from stainless steel.

A plurality of pipes may be connected to the housing 102 for introducing various fluids therein and removing various fluids therefrom. In the exemplary illustration, an oil mixture feed pipe 112 is connected to the housing 102 so as to communicate with the inside of the first chamber 106. The oil mixture feed pipe 112 is used to introduce the oil mixture to be filtered into the first chamber 106 from a source not shown, typically a mixing tank. Arrow 110 indicates the direction of flow through the oil mixture feed pipe 112. The oil mixture feed pipe 112 is equipped with a corresponding control valve 114 for controlling the flow through their respective pipe 112. The oil mixture feed valve 114 may be of any suitable valve type, such as a gate valve, and may be manually operated or automatically operated.

A filtrate discharge pipe 118 and a backwash feed pipe 124 may be connected to the housing 102 so as to communicate with the inside of the second chamber 108. The filtrate discharge pipe 118 is used to remove filtrate or purified oil which passes through and is filtered by the filter element 104. Arrow 116 indicates the direction of flow through the filtrate discharge pipe 118.

The filtrate discharge pipe 118 may be equipped with a corresponding control valve 120. The filtrate discharge valve 120 may be of any suitable valve type such as a gate valve. The control valve 120 can be controlled manually, or they can be automatically controlled, for example, made to operate according to a prescribed sequence by any suitable programmable control unit.

When appropriate, the filter element 104 may be cleaned and fresh precoat material formed thereon. This may be performed by a backwashing operation, or by interrupting the bleaching/filtering operation and manually removing the spent filtercake. Manual removal includes using vibration, a liquid stream, agitation, centrifugal force, and the like. A horizontal tank with removable vertical filter elements (removable for cleaning) is preferably used when manual cleaning is employed. In such an arrangement, when using the bleaching material of the present invention, occurrences of filtercake removal and filter element cleaning are decreased.

Although not shown, it is possible for the filter system 100 to have two or more pipes connected to the first chamber 106. In this instance, the additional pipe can be used for removing backwash. The backwash drain pipe is used to remove unwanted materials from the first chamber 106 and also to drain the first chamber 106. Although not shown, it is possible for the filter system 100 to have two or more pipes connected to the second chamber 108. In this instance, the additional pipe can be used for introducing the backwash into the system. A backwash feed pipe may be used to supply a suitable backwash liquid to the second chamber 108 from any suitable source.

Although not shown, the filter system 100 may further optionally include a pressurized gas feed to supply compressed gas, make up connections, drain connections, over-flow connections, cleaning connections, corresponding valves, and the like. Pressure may also be applied through the oil mixture feed pipe 112.

When applying pressure, a sufficient amount of pressure is applied to pass the raw oil through the filtercake and filter element. In one embodiment, the pressure applied is from about 1 psig to about 150 psig. In another embodiment, the pressure applied is from about 2 psig to about 100 psig. In yet another embodiment, the pressure applied is from about 5 psig to about 50 psig.

Raw vegetable oils often contain undesirably high amounts of chlorophyll. Using the acid activated clay having the size distribution in accordance with the present invention, the content of chlorophyll in raw vegetable oils can be reduced to below about 150 ppb and/or by at least about 50% by weight. In another embodiment, the content of chlorophyll in raw vegetable oils can be reduced to below about 100 ppb and/or by at least about 75% by weight. In yet another embodiment, the content of chlorophyll in raw vegetable oils can be reduced to below about 50 ppb and/or by at least about 85% by weight.

When used as a bleaching filteraid (used in combination with a conventional bleaching earth), in one embodiment, from about 1,200 to about 7,200 pounds of oil can be bleached and filtered per pound of the acid activated clay made in accordance with the present invention acting as a bleaching filteraid. In another embodiment, from about 2,500 to about 7,000 pounds of oil can be bleached and filtered per pound of the acid activated clay made in accordance with the present invention acting as a bleaching filteraid.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

EXAMPLE 1

Acid activated montmorillonite is pulverized and screened to provide a product having specified amounts of material having a certain particle size, as describe in Table 1 (% by volume of particles having the specified particle size).

EXAMPLE 2

Acid activated montmorillonite is pulverized and screened to provide a product having specified amounts of material having a certain particle size, as describe in Table 1 (% by volume of particles having the specified particle size).

EXAMPLE 3

Acid activated montmorillonite is pulverized and screened to provide a product having specified amounts of material having a certain particle size, as describe in Table 1 (% by volume of particles having the specified particle size).

EXAMPLE 4

Acid activated montmorillonite is pulverized and screened to provide a product having specified amounts of material having a certain particle size, as describe in Table 1 (% by volume of particles having the specified particle size).

TABLE 1

| Particle size, microns | Example 1 Volume % | Example 2 Volume % | Example 3 Volume % | Example 4 Volume % | Example 5 Volume % |
|---|---|---|---|---|---|
| 0.058 | 0.009 | 0.004 | 0.003 | 0.007 | 0.002 |
| 0.068 | 0.017 | 0.008 | 0.006 | 0.014 | 0.005 |
| 0.079 | 0.025 | 0.011 | 0.009 | 0.020 | 0.007 |
| 0.092 | 0.033 | 0.016 | 0.012 | 0.028 | 0.010 |
| 0.107 | 0.042 | 0.021 | 0.017 | 0.036 | 0.014 |
| 0.125 | 0.052 | 0.027 | 0.023 | 0.046 | 0.019 |
| 0.146 | 0.065 | 0.038 | 0.032 | 0.060 | 0.028 |
| 0.170 | 0.085 | 0.054 | 0.049 | 0.080 | 0.042 |
| 0.198 | 0.113 | 0.081 | 0.077 | 0.109 | 0.066 |
| 0.230 | 0.151 | 0.121 | 0.124 | 0.148 | 0.106 |
| 0.268 | 0.193 | 0.172 | 0.188 | 0.191 | 0.160 |
| 0.313 | 0.223 | 0.212 | 0.242 | 0.222 | 0.206 |
| 0.364 | 0.226 | 0.219 | 0.253 | 0.226 | 0.216 |
| 0.424 | 0.212 | 0.204 | 0.235 | 0.211 | 0.202 |
| 0.494 | 0.201 | 0.194 | 0.224 | 0.200 | 0.194 |
| 0.576 | 0.194 | 0.188 | 0.218 | 0.191 | 0.190 |
| 0.671 | 0.182 | 0.172 | 0.199 | 0.178 | 0.175 |
| 0.781 | 0.182 | 0.170 | 0.197 | 0.177 | 0.173 |
| 0.910 | 0.203 | 0.186 | 0.213 | 0.197 | 0.189 |
| 1.060 | 0.232 | 0.210 | 0.238 | 0.225 | 0.214 |
| 1.235 | 0.271 | 0.244 | 0.276 | 0.263 | 0.250 |
| 1.439 | 0.322 | 0.290 | 0.327 | 0.313 | 0.299 |
| 1.677 | 0.379 | 0.341 | 0.379 | 0.367 | 0.353 |
| 1.953 | 0.438 | 0.392 | 0.430 | 0.423 | 0.407 |
| 2.276 | 0.502 | 0.452 | 0.489 | 0.485 | 0.469 |
| 2.651 | 0.560 | 0.507 | 0.542 | 0.543 | 0.526 |
| 3.089 | 0.606 | 0.551 | 0.580 | 0.591 | 0.568 |
| 3.598 | 0.641 | 0.586 | 0.607 | 0.629 | 0.599 |
| 4.192 | 0.672 | 0.620 | 0.635 | 0.666 | 0.630 |
| 4.884 | 0.701 | 0.655 | 0.667 | 0.702 | 0.665 |
| 5.690 | 0.729 | 0.692 | 0.700 | 0.738 | 0.702 |
| 6.628 | 0.752 | 0.722 | 0.725 | 0.767 | 0.732 |
| 7.722 | 0.769 | 0.738 | 0.731 | 0.785 | 0.747 |
| 8.996 | 0.793 | 0.750 | 0.732 | 0.803 | 0.758 |
| 10.480 | 0.838 | 0.768 | 0.742 | 0.829 | 0.777 |
| 12.210 | 0.913 | 0.797 | 0.771 | 0.872 | 0.814 |
| 14.224 | 1.039 | 0.856 | 0.847 | 0.948 | 0.890 |
| 16.571 | 1.233 | 0.965 | 1.001 | 1.074 | 1.034 |
| 19.306 | 1.513 | 1.147 | 1.266 | 1.270 | 1.277 |
| 22.491 | 1.892 | 1.428 | 1.676 | 1.553 | 1.651 |
| 26.202 | 2.377 | 1.832 | 2.262 | 1.938 | 2.184 |
| 30.525 | 2.962 | 2.374 | 3.040 | 2.429 | 2.892 |
| 35.562 | 3.627 | 3.061 | 4.001 | 3.021 | 3.775 |
| 41.430 | 4.337 | 3.880 | 5.096 | 3.697 | 4.796 |
| 48.265 | 5.038 | 4.784 | 6.216 | 4.417 | 5.870 |
| 56.229 | 5.671 | 5.691 | 7.214 | 5.127 | 6.872 |
| 65.507 | 6.177 | 6.499 | 7.956 | 5.766 | 7.677 |
| 76.316 | 6.517 | 7.098 | 8.379 | 6.274 | 8.211 |
| 88.908 | 6.716 | 7.453 | 8.580 | 6.638 | 8.544 |
| 103.578 | 6.837 | 7.602 | 7.904 | 6.883 | 8.042 |
| 120.668 | 6.566 | 7.634 | 6.893 | 7.060 | 7.187 |
| 140.578 | 6.107 | 7.054 | 5.670 | 6.812 | 6.076 |
| 163.773 | 5.459 | 6.191 | 4.356 | 6.305 | 4.796 |
| 190.796 | 4.625 | 5.086 | 3.067 | 5.514 | 3.517 |
| 222.277 | 3.653 | 3.847 | 1.917 | 4.479 | 2.237 |
| 258.953 | 2.681 | 2.608 | 0.768 | 3.312 | 0.958 |
| 301.680 | 1.708 | 1.369 | 0.000 | 2.151 | 0.000 |
| 351.457 | 0.736 | 0.130 | 0.000 | 0.991 | 0.000 |
| 409.448 | 0.000 | 0.000 | 0.000 | 0.000 | 0.000 |
| 477.007 | 0.000 | 0.000 | 0.000 | 0.000 | 0.000 |
| 555.713 | 0.000 | 0.000 | 0.000 | 0.000 | 0.000 |
| 647.406 | 0.000 | 0.000 | 0.000 | 0.000 | 0.000 |
| 754.227 | 0.000 | 0.000 | 0.000 | 0.000 | 0.000 |
| 878.675 | 0.000 | 0.000 | 0.000 | 0.000 | 0.000 |

EXAMPLE 5

Acid activated montmorillonite is pulverized and screened to provide a product having specified amounts of material having a certain particle size, as describe in Table 1 (% by volume of particles having the specified particle size).

EXAMPLE 6

Charge 5.0 g of Example 5 to 400 g raw soybean oil. The raw soybean oil has a chlorophyll content of 323 ppb. Heat to 90° C. and charge to pressure filtration vessel maintained at 90° C. Increase vessel pressure incrementally to 40 psig to form a cake. Continue pressure filtration by cycling filtered oil through pressure filtration until the oil effluent is clear. The filtered soybean oil has a chlorophyll content of 24 ppb. This example demonstrates the bleaching activity of Example 5.

Comparative Example 1

Charge 5.0 g Celite Hyflo filteraid to 400 g raw soybean oil. The raw soybean oil has a chlorophyll content of 288 ppb. Heat to 90° C. and charge to pressure filtration vessel maintained at 90° C. Increase vessel pressure incrementally to 40 psig to form a cake. Continue pressure filtration by cycling filtered oil through pressure filtration until the oil effluent is clear. The filtered soybean oil has a chlorophyll content of 245 ppb. This example shows conventional filteraid has little or no bleaching activity.

Packed Bed Bleaching Example 30 g of Example 5 is added to 350 g raw soybean oil at room temperature, then charge to the pressure filtration vessel maintained at 90° C. The apparatus is pressured with air (5 psig, 10 psig, 20 psig, 40 psig) and oil flowrates are recorded. Chlorophyll content is also measured on filtered oil samples. Additional raw oil is added incrementally while maintaining an oil-saturated filtercake. A total of 2880 g of raw soybean oil is filtered through the Example 5 packed bed filter.

Figure 2:
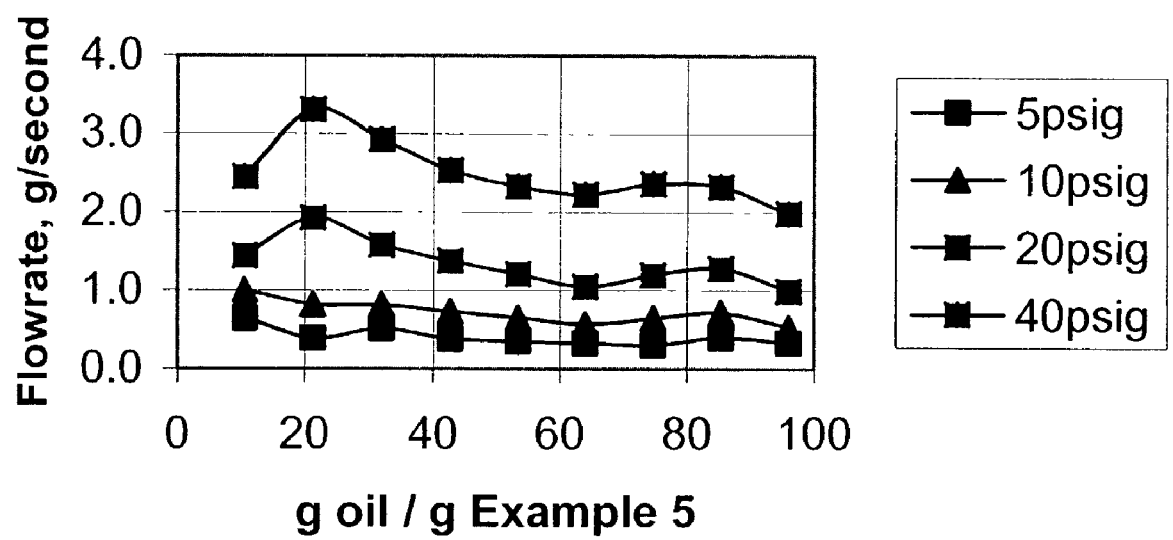
FIG. 2 is a graph showing the relationship between flowrate and amount of oil filtered per amount of acid activated clay in a packed bed filtration process in accordance with one aspect of the present invention.

FIG. 2 shows very little decline in flowrate during the course of the experiments. Flowrates shown in this example are two to ten times higher than typical commercial operation demonstrating the excellent pressure drop characteristics of Example 5.

Figure 3:
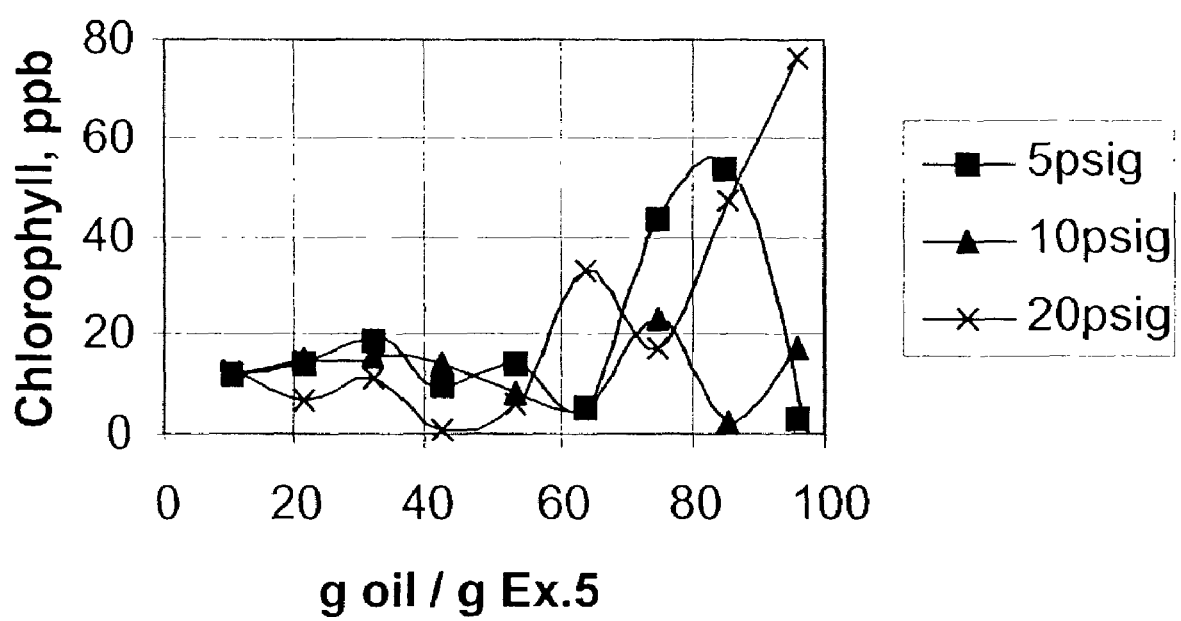
FIG. 3 is a graph showing the relationship between amount of chlorophyll in the effluent and amount of oil filtered per amount of acid activated clay in a packed bed filtration process in accordance with one aspect of the present invention.

FIG. 3 demonstrates the efficacy of Example 5 in packed bed bleaching. In commercial applications, it is often desirable for chlorophyll values of bleached and filtered oil to be less than 100 ppb. Even at high flowrates, the bleached and filtered oil easily meets the target chlorophyll content, below 100 ppb.

Figure 4:
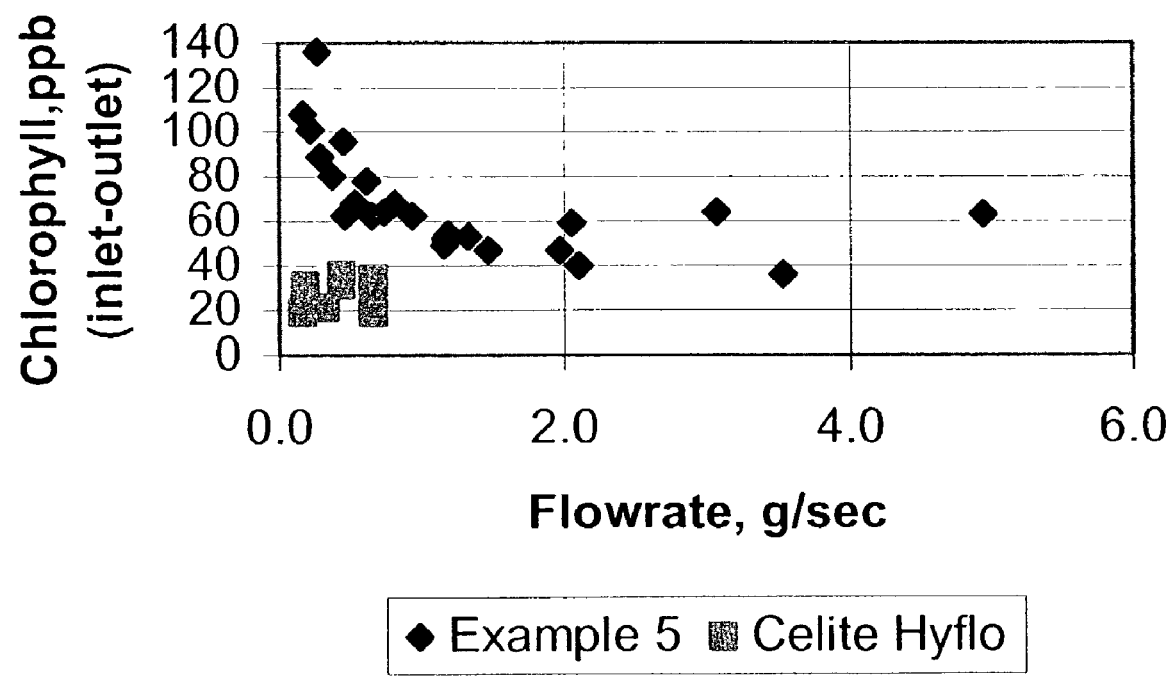
FIG. 4 is a graph showing the relationship between amount of chlorophyll in the effluent and flowrate in a press effect filtration process in accordance with one aspect of the present invention.

Press Effect Bleaching Example 5 g of Example 5 is added to 320 g raw soybean oil, heated to 90° C., then added to the pressure filter forming a filtercake as previously described. In a second vessel, 410 g of raw soybean oil is bleached with F-115FF (0.1 to 0.3% by weight) at 90° C. for 20 minutes. The oil/clay mixture is then added to the pressure filter and chlorophyll content is measured on the filtered oil. FIG. 4 shows the additional press effect bleaching provided by the Example 5 filtercake (Press effect bleaching is chlorophyll content at filter outlet minus chlorophyll content at filter inlet). Press effect bleaching is higher at low filtration rates due to increased contact time. This example shows a substantial press effect using Example 5 compared to a competitive filteraid, as described below.

5 g of Celite Hyflo filteraid is added to 320 g raw soybean oil, heated to 90° C., then added to the pressure filter forming a filtercake as previously described. In a second vessel, 340 g of raw soybean oil is bleached with F-115FF (0.1 to 0.3% by weight) at 90° C. for 20 minutes. The oil/clay mixture is then added to the pressure filter and chlorophyll content is measured on the filtered oil. FIG. 4 shows the press effect bleaching provided by the Celite Hyflo/F-115FF filtercake (Press effect bleaching is chlorophyll content at filter outlet minus chlorophyll content at filter inlet). This example shows minimal press effect using Celite Hyflo filteraid.

Figure 5:
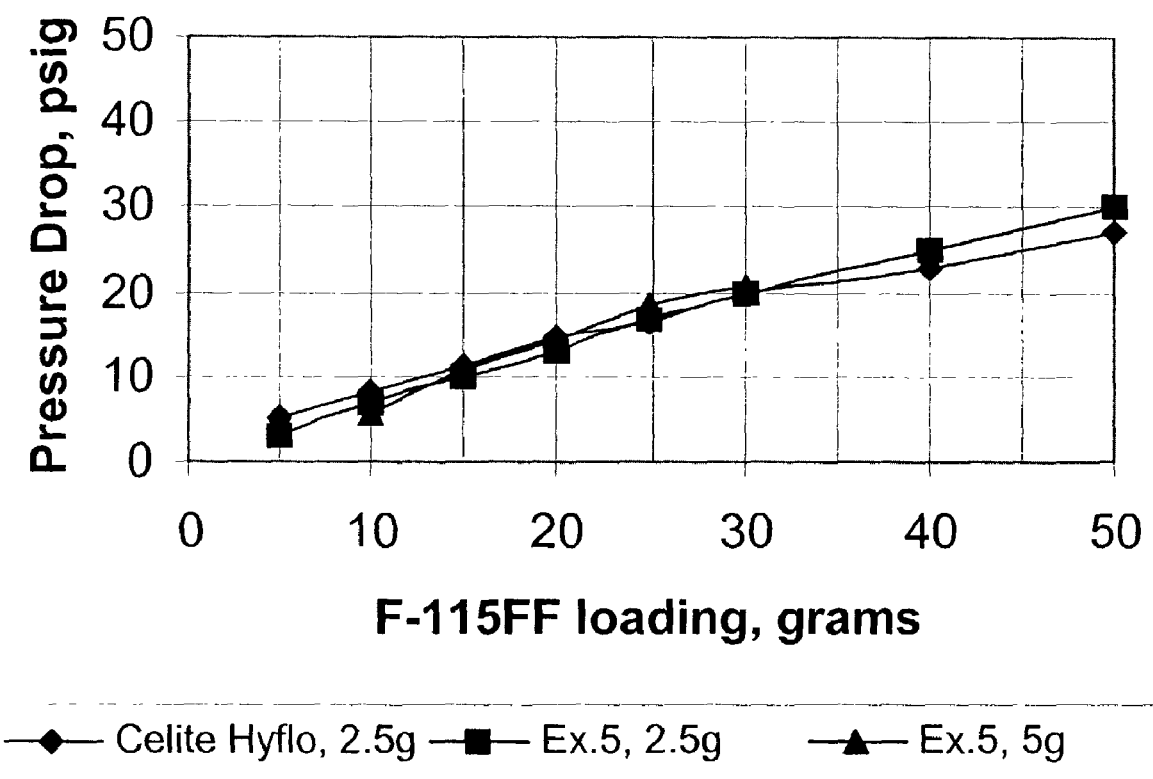
FIG. 5 is a graph showing the relationship between pressure drop and F-115FF loading when various filteraids are employed.

Filter Rate Comparison 2.5 g of Example 5 is slurried in soybean oil at 80° C., then added to a pressurized filter. The vessel is pressurized forming a filter cake as soybean oil eluted from the apparatus. Once the filtercake formed, known quantities of bleaching clay (F-115FF) are added. FIG. 5 shows the pressure required to maintain a constant oil flowrate (100 lb per hour per sq ft filter area flowrate) versus quantity of F-115FF added. The figure shows equal weights of conventional Celite Hyflo filteraid and Example 5 have similar filtration characteristics. Example 5 shows no decline in filtration characteristic even at twice the loading.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A bleaching material for processing oils, comprising:
   an acid activated clay wherein at least 90% by volume of the acid activated clay has a particle size range of about 15 μm or more and about 325 μm or less; more than 50% by volume of the acid activated clay has a particle size range of about 50 μm or more and about 150 μm or less; and at least 30% by volume of the acid activated clay has a particle size range of about 100 μm or more;
   wherein the acid activated clay has a surface area from about 300 m$^2$/g to about 400 m$^2$/g.

2. The bleaching material of claim 1, wherein the acid activated clay comprises montmorillonite.

3. The bleaching material of claim 1, wherein at least 90% by volume of the acid activated clay has a particle size range of about 20 μm or more and about 300 μm or less; more than 50% by volume of the acid activated clay has a particle size range of about 60 μm or more and about 140 μm or less; at least 30% by volume of the acid activated clay has a particle size range of about 100 μm or more; and the acid activated clay acts as a filteraid.

4. A method of making a bleaching material, comprising:
   contacting clay with an acid;
   removing small and large particles to provide a bleaching material comprising an acid activated clay wherein at least 90% by volume of the acid activated clay has a particle size range of about 15 μm or more and about 325 μm or less; more than 50% by volume of the acid activated clay has a particle size range of about 50 μm or more and about 150 μm or less; and at least 30% by volume of the acid activated clay has a particle size range of about 100 μm or more;
   wherein the acid activated clay has a surface area from about 300 m$^2$/g to about 400 m$^2$/g.

5. The method of claim 4, wherein the acid activated clay comprises montmorillonite, and the acid comprises a mineral acid.

6. The method of claim 4, wherein removing small and large particles comprises at least one selected from the group consisting of crushing techniques, pulverization techniques, air classification techniques, and screening techniques.

7. The method of claim 4, wherein at least 30% by volume of the acid activated clay has a particle size range of about 75 µm or more and about 120 µm or less.

8. The method of claim 4, wherein at least 90% by volume of the acid activated clay has a particle size range of about 20 µm or more and about 300 µm or less; more than 50% by volume of the acid activated clay has a particle size range of about 60 µm or more and about 140 µm or less; and more than 30% by volume of the acid activated clay has a particle size of about 100 µm or more.

9. A method of making a bleaching material, comprising:
contacting clay with an acid; and
removing small and large particles to provide a bleaching material comprising an acid activated clay wherein more than 30% by volume of the acid activated clay has a particle size of about 100 µm or more;
wherein the acid activated clay has a surface area from about 300 $m^2/g$ to about 400 $m^2/g$.

10. The method of claim 9, wherein removing small and large particles comprises at least one selected from the group consisting of crushing techniques, pulverization techniques, air classification techniques, or screening techniques.

11. The method of claim 9, wherein the acid comprises a mineral acid and/or an organic acid.

12. The method of claim 9, wherein the acid activated clay comprises smectite and/or hectorite.

13. The method of claim 9, wherein the acid activated clay comprises montmorillonite.

14. A bleaching material for processing oils, comprising:
an acid activated clay wherein more than 30% by volume of the acid activated clay has a particle size of about 100 µm or more;
wherein the acid activated clay has a surface area from about 300 $m^2/g$ to about 400 $m^2/g$.

15. The bleaching material of claim 14, wherein the acid activated clay comprises montmorillonite.

16. The bleaching material of claim 14, wherein the acid activated clay comprises smectite and/or hectorite.

17. The bleaching material of claim 14, wherein at least 90% by volume of the acid activated clay has a particle size range of about 15 µm or more and about 305 µm or less.

18. The bleaching material of claim 14, wherein at least 90% by volume of the acid activated clay has a particle size range of about 20 µm or more and about 300 µm or less.

19. The bleaching material of claim 14, wherein the acid activated clay comprises particles wherein at least 40% by volume of the acid activated clay has a particle size of at least about 100 µm or more; and the acid activated clay acts as a filteraid.

20. The bleaching material of claim 14, wherein the acid activated clay comprises particles wherein at least 45% by volume of the acid activated clay has a particle size of at least about 100 µm or more.

21. The method of claim 9, wherein at least 90% by volume of the acid activated clay has a particle size range of about 15 µm or more and about 305 µm or less.

22. The method of claim 9, wherein the acid activated clay comprises particles wherein at least 40% by volume of the acid activated clay has a particle size of at least about 100 µm or more.

* * * * *